US012645461B2

(12) United States Patent
Popovic et al.

(10) Patent No.: US 12,645,461 B2
(45) Date of Patent: Jun. 2, 2026

(54) SYSTEMS AND METHODS RELATING TO A VIRTUAL CHANNEL ENABLED CREDIT BASED REPEATER PIPELINE

(71) Applicants: Advanced Micro Devices, Inc., Santa Clara, CA (US); ATI Technologies ULC, Markham (CA)

(72) Inventors: Josip Popovic, Markham (CA); Anshuman Mittal, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 691 days.

(21) Appl. No.: 17/993,803

(22) Filed: Nov. 23, 2022

(65) Prior Publication Data

US 2025/0328886 A1 Oct. 23, 2025

(51) Int. Cl.
| | |
|---|---|
| *G06F 9/38* | (2018.01) |
| *G06F 9/455* | (2018.01) |
| *G06F 15/163* | (2006.01) |
| *H04L 47/10* | (2022.01) |
| *H04L 47/62* | (2022.01) |

(52) U.S. Cl.
CPC ........ *G06F 9/3826* (2013.01); *G06F 9/45558* (2013.01); *G06F 15/163* (2013.01); *H04L 47/39* (2013.01); *H04L 47/621* (2013.01); *G06F 2009/45595* (2013.01)

(58) Field of Classification Search
None
See application file for complete search history.

(56) References Cited

PUBLICATIONS

Sanchez et al., "An Analysis of On-Chip Interconnection Networks for Large-Scale Chip Multiprocessors", Apr. 2010, ACM Transactions on Architecture and Code Optimization, vol. 7, No. 1. (Year: 2010).*
Bjerregaard et al., "A Survey of Research and Practices of Network-on-Chip", Mar. 2006, ACM Computing Surveys, vol. 38. (Year: 2006).*
Seitanidis et al., "ElastiStore: Flexible Elastic Buffering for Virtual-Channel-Based Networks on Chip", Dec. 2015, IEEE Transactions on Very Large Scale Integration (VLSI) Systems, vol. 23, No. 12, pp. 3015-3028. (Year: 2015).*

* cited by examiner

*Primary Examiner* — Qing Yuan Wu
(74) *Attorney, Agent, or Firm* — Greenberg Traurig, LLP

(57) ABSTRACT

A disclosed system can include (i) a data consumer, (ii) a data producer, and (iii) a virtual channel enabled credit repeater pipeline that connects the data consumer and the data producer across at least both a guaranteed track and an opportunistic track. The virtual channel enabled credit repeater pipeline at the data producer can forward virtual channel data across the opportunistic track based on an amount of credits being insufficient. Various other methods, systems, and apparatuses are also disclosed.

20 Claims, 7 Drawing Sheets

100

200

Producer

202

Fastest Credit to Data Return
Path for Certain Repeater Implementations 204    208        208        208  210    Consumer
206

212

SYSTEMS AND METHODS RELATING TO A VIRTUAL CHANNEL ENABLED CREDIT BASED REPEATER PIPELINE

BACKGROUND

In the context of modern computing chips, repeater pipelines can be used on long interfaces where end-to-end data transfer time is larger than a clock cycle. Nevertheless, certain repeater pipelines can exhibit deficiencies or shortcomings. Accordingly, this application discloses both problems and solutions related to improved repeater pipelines, as discussed further below.

BRIEF DESCRIPTION OF THE DRAWINGS

The accompanying drawings illustrate a number of example embodiments and
are a part of the specification. Together with the following description, these drawings demonstrate and explain various principles of the present disclosure.

DETAILED DESCRIPTION OF EXAMPLE IMPLEMENTATIONS

Figure 1:
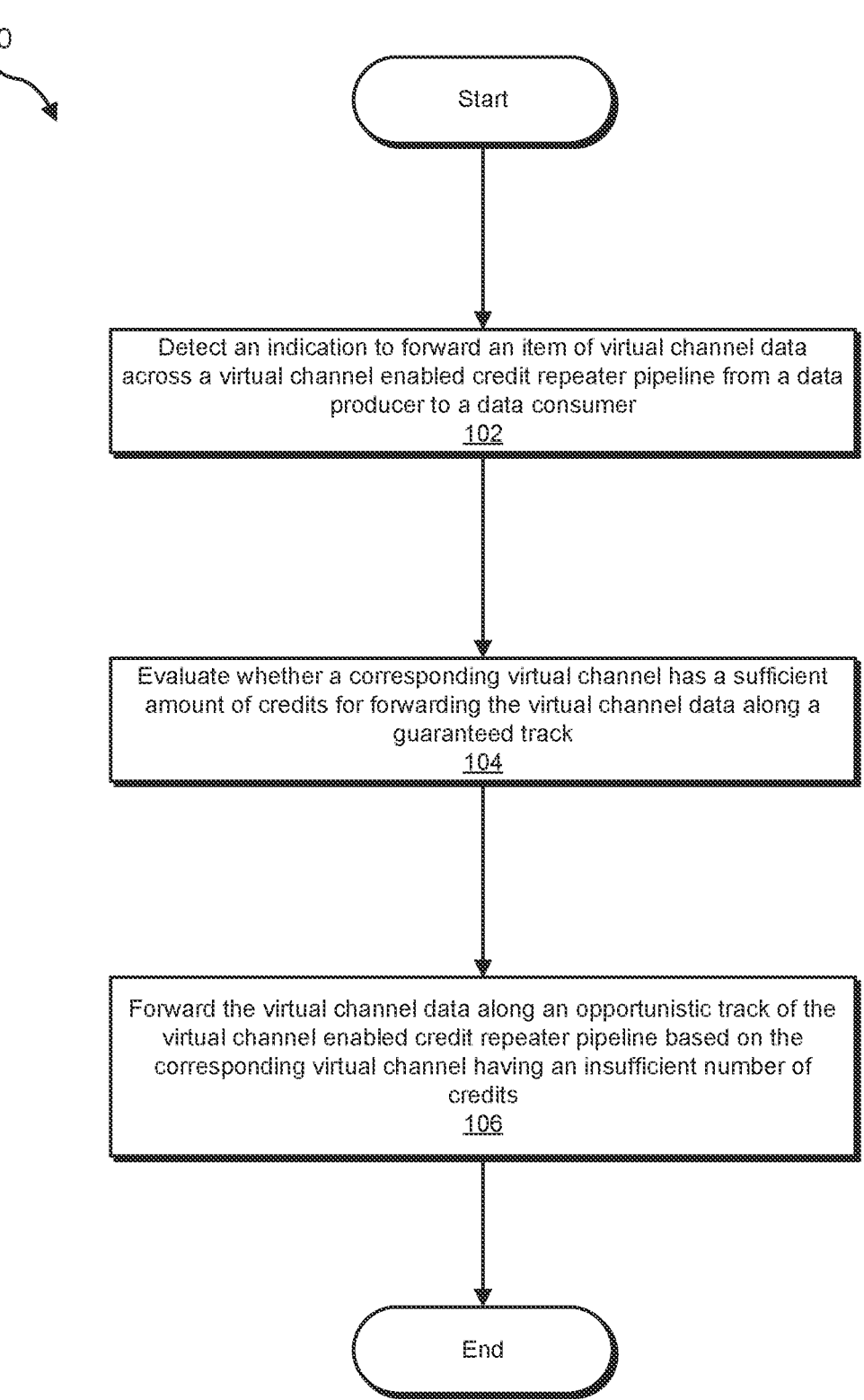
FIG. 1 is a flow diagram for an example method.

The present disclosure is generally directed to improved credit repeater pipelines ("CRP"s). Generally speaking, as used herein repeater pipelines can refer to a chain of repeating flops for forwarding data between chiplets or across a chiplet or across a monolithic chip die. As used herein, the term "flop" can include a latch. At one end of a repeater pipeline can be a data producer, which produces data or workloads for processing by a data consumer. The data consumer is generally positioned at the opposite end of the repeater pipeline. As used herein, the term "data producer" can broadly refer to a subcomponent on a computing chip or chiplet that produces data or workloads for processing by a corresponding "data consumer."
Certain repeater pipelines and corresponding topologies can exhibit one or more deficiencies, which can be addressed by various ones of the embodiments of this application. For example, some repeater pipelines can be passive. These repeater pipelines might only be used to re-time buses, for example. Such repeater pipelines might not implement a credit system, thereby preventing endpoints of the repeater pipelines from understanding bandwidth availability at a respective opposite end point. Even in the case where repeater pipelines participate in a credit system, the pipelines themselves might not act on the credits but instead only the endpoints might use them.
In view of the above, this application discloses an update where the repeater pipelined stages are used as storage, in addition to performing signal retiming, obeying the credit protocol, providing ordered (within a virtual channel), non-blocking (between virtual channels) data forwarding, autonomously removing bubbles inside the pipeline, and while using only two data forwarding tracks: guaranteed track and opportunistic track, as discussed further below. In comparison to related passive or non-credit-based repeater pipelines, as discussed above, one or more improved embodiments of this application achieve area reduction and improved efficiency. The achievement of area reduction can correspond to consumer input buffering size reduction by an amount that is similar to the repeater pipeline depth. In terms of improved efficiency, embodiments of this application can shorten the credit-request return latency (i.e., referring to data stored in the repeater pipeline).
Beyond the improvements to credit repeater pipelines (see FIGS. 2-6), this application also discloses both virtual channel enabled credit repeater pipelines (VCRPs) (see FIG. 5) and scalable virtual channel enabled credit repeater pipelines (see FIG. 6). These subsequent refinements are associated with dramatic benefits in comparison to related methodologies, as discussed in more detail below.
In some examples, a corresponding system includes a data consumer, a data producer, and a virtual channel enabled credit repeater pipeline that connects the data consumer and the data producer across at least both a guaranteed track and an opportunistic track. In such examples, the virtual channel enabled credit repeater pipeline at the data producer forwards virtual channel data across the opportunistic track based on an amount of credits being insufficient (e.g., where destination credits are insufficient, but an opportunistic track transport credit is available).
In some examples, the data producer includes a receptor that receives a control signal across the virtual channel enabled credit repeater pipeline and a transmitter that provides data for consumption by the data consumer at an opposite end of the virtual channel enabled credit repeater pipeline. In some examples, the data consumer includes a transmitter that provides a control signal across the virtual channel enabled credit repeater pipeline and a receptor that receives data for consumption from a data producer at an opposite end of the virtual channel enabled credit repeater pipeline.
In some examples, the virtual channel enabled credit repeater pipeline includes a scalable virtual channel enabled credit repeater pipeline that supports multiple virtual channels.
In further examples, the scalable virtual channel enabled credit repeater pipeline enables a number of the virtual channels that is substantially greater than a number of physical tracks of the scalable virtual channel enabled credit repeater pipeline stages.
In some examples, a number of separate paths within each stage of the virtual channel enabled credit repeater pipeline matches a number of virtual channels enabled by the virtual channel enabled credit repeater pipeline.
In some examples, the virtual channels share a same single physical path between stages of the virtual channel enabled credit repeater pipeline.
In some examples, the separate paths within each stage of the virtual channel enabled credit repeater pipeline enables one virtual channel to continue processing while another virtual channel momentarily stalled.

In some examples, each stage within multiple stages of a repeater chain for the virtual channel enabled credit repeater pipeline are substantially identical.

In some examples, the virtual channel enabled credit repeater pipeline supports N number of virtual channels through N sets of parallel data words.

In some examples, each data word is as wide as a widest virtual channel.

In some examples, stages of the virtual channel enabled credit repeater pipeline are connected by through silicon via bridges.

This application also further discloses a corresponding data producer and a data consumer, as further outlined below.

Beginning with FIG. 1, this figure shows a flow diagram for a method 100 relating to a virtual channel enabled credit repeater pipeline. At step 102, one or more of the systems described herein can detect an indication to forward an item of virtual channel data across a virtual channel enabled credit repeater pipeline from a data producer to a data consumer. The indication to forward the item of virtual channel data might be based a number of destination credits and/or guaranteed track transport credits, as discussed further below.

As used herein, the term "forward" can refer to moving or propagating data, as along a credit repeater pipeline. The term "credit repeater pipeline" generally refers to a repeater pipeline that implements a credit system to manage bandwidth and storage availability as data moves across the repeater pipeline. In some examples, a credit repeater pipeline can implement a credit system that monitors and manages available space not just at one or more endpoints (e.g., space available within a FIFO at the data consumer), but also available space within the pipeline itself, as discussed in more detail below.

Furthermore, the term "virtual channel data" generally refers to data belonging to a particular virtual channel. An item of virtual channel data can correspond to a word of data, and the virtual channel itself can have bandwidth corresponding to that word. Moreover, as used herein, the term "virtual channel" can generally refer to a flow of data or information, and can be contrasted with a physical channel such that multiple virtual channels can be propagated, communicated, interspersed, or mixed across a single physical channel (or a smaller number of physical channels in comparison to the number of virtual channels), such as by using metadata or tags that properly marks data to indicate which specific virtual channel a subset of data actually belongs to. In some examples, a width of a virtual channel (e.g., a widest virtual channel of multiple virtual channels supported) can correspond to a size/width of a data word. Virtual channels will be discussed in more detail in connection with step 104 of method 100, as discussed further below.

Before discussing step 102 in more detail, it can be helpful to provide some background discussion of the technological context relating to this application. In the modern computing chip marketplace, chiplets are becoming increasingly important. Chiplets generally seek to communicate between each other, and also to communicate with the centralized main die. In a modern computing chip environment, a multitude of different chiplets might be issuing a significantly larger number of messages between each other. Additionally, within a same single chiplet, two different blocks (e.g., a data consumer and a data producer) can also communicate with each other over a relatively large distance.

In the context of inter-chiplet communication, two separate chiplets can communicate with each other over a through silicon via (TSV), which is a specialized hardware structure that electrically connects chiplets. Moreover, the structure of the through silicon via is generally highly capacitive, as well as being relatively expensive. Accordingly, reducing a number of signals going across through silicon via structures can be beneficial.

In order to send signals between chiplets, or to send signals between two separate blocks on the same chiplet, manufacturers might encounter a need to re-time signals between the source and the destination (e.g., due to the distance involved). Accordingly, these many factors can set up repeater pipelines, as further discussed above, which are basically chained together flops (or functionally equivalent logical components), thereby forming flop stages. Within such repeater pipelines, data can evenly propagate from stage to stage according to the clock cycle. The distance between individual stages of repeater pipeline can depend upon which specific components are disposed between these individual stages. In the case of a through silicon via bridge between two stages of the repeater pipeline, and the distance between stages is relatively shorter than otherwise. In the context of a single die, then signals can proceed outward for relatively larger distances, although the ultimate distance can depend upon the clock rate. Generally speaking, signals are not modified when traversing the repeater pipeline, but simply propagate according to the clock rate, for example.

In certain related embodiments, repeater pipelines can be very passive. In other words, the repeater pipelines can generally be configured to simply propagate data without additional processing or modification. In contrast, this application generally discloses a repeater pipeline configuration in which the pipeline itself can be treated as a functional extension of a FIFO queue at one end of the pipeline (e.g., an extension of a FIFO at the data consumer). Accordingly, in these examples, the repeater pipeline functions not only to propagate data between a source and destination, but also functions as intermediate storage itself, as discussed in more detail below.

The extending of functionality of the repeater pipeline to provide intermediate storage rather than simply propagating data from source to destination results in a number of benefits. In the case that the repeater pipeline is functioning as a storage itself, then the storage needed at one end of the pipeline (e.g., the size of the FIFO at the data consumer) can be proportionately reduced. Accordingly, in these scenarios, when the data consumer is available and seeking additional workloads, then the data consumer can transmit a notification to the corresponding data producer seeking these additional workloads. However, if the repeater pipeline does not operate as a gapless storage, then the delay when the data consumer can receive data from the producer is longer. Moreover, the repeater pipeline can be gapless, which means that it can squeeze out bubbles.

In certain related embodiments, a data consumer can inform a corresponding data producer that the data consumer has bandwidth to accept additional workloads by transmitting a signal. Without treating the pipeline itself as storage, however, the signal would only indicate available bandwidth at the data consumer's own FIFO, rather than reflecting the expanded storage available through usage of the pipeline itself as storage. This limitation can reflect a significant disadvantage. By way of illustrative example, if a passive repeater pipeline is N stages deep, then a 2×N deep FIFO would be involved, whereas if one word per stage is used for a credit repeater pipeline, this FIFO could be N deep. If the credit repeater pipeline has two words per stage than the FIFO could be removed.

Figure 2:
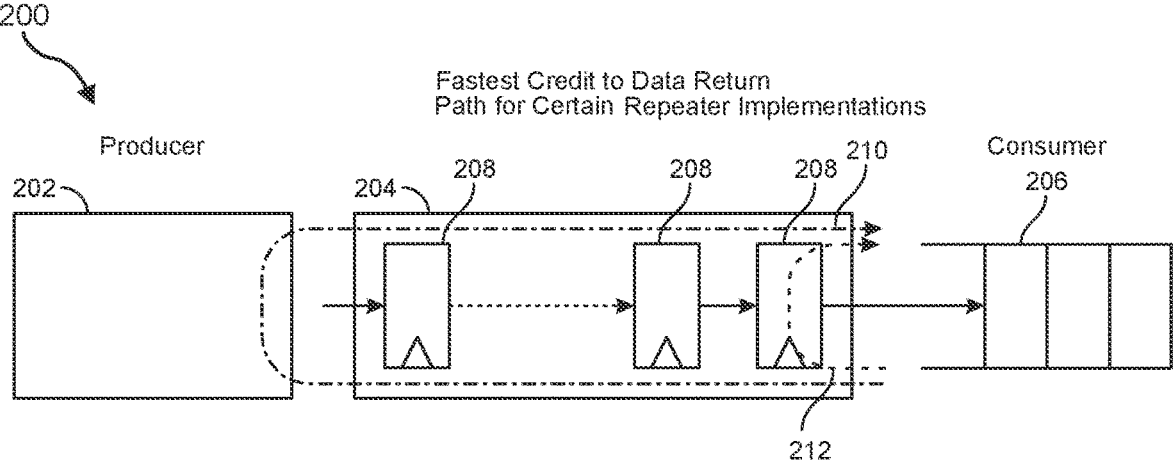
FIGS. 2-3 are block diagrams illustrating concepts related to credit repeater pipelines.

Step 102 can be performed in a variety of ways. By way of illustrative example, FIG. 2 shows a system 200 including a producer 202 and a consumer 206, which are together connected by a repeater pipeline 204. This figure also further illustrates how repeater pipeline 204 can include multiple instances of a stage 208. The figure also further illustrates, using a triangle symbol, how each stage 208 can be clocked and movement along repeater pipeline 204 can proceed according to a corresponding clock signal. Although this figure is simplified for purposes of illustration and explanation, in some more practical examples the repeater pipeline might have a number of stages on the order of sixteen or 32, for example.

In the example of FIG. 2, if the producer and the consumer are too far apart from each other, then a manufacturer can insert flop repeater stages to thereby satisfy backend timing requirements. In certain embodiments of repeater pipelines, which are not based on the credit system, these pipelines return data for a just pushed credit after the completion of the round-trip time from the consumer to the producer (credit) then from the producer to the consumer (data), as indicated by the longer "U" shaped arrow 210 in this figure. This represents the best case data return path.

In contrast to the above, a repeater pipeline based on a credit system can reduce this latency (e.g., credit to data latency corresponding to arrow 210) by making extra use of flop repeater stages. In other words, each stage of the credit repeater pipeline can be treated as a separate storage element. This configuration can reduce the credit to data return path from the path indicated by arrow 210 to the path indicated by a smaller arrow 212. This figure indicates that the latency associated with these two different arrows is also different.

In view of the above, producer 202 can perform step 102 at least in part by detecting a new clock cycle. The new clock cycle can trigger logical- or hardware-implemented intelligence at producer 202 to verify whether repeater pipeline 204 and/or consumer 206 have sufficient storage/bandwidth for forwarding virtual channel data across the repeater pipeline. In the case that there is sufficient storage/bandwidth, then producer 202 can deposit or propagate an item of virtual channel data for transmission from producer 202 to consumer 206.

Figure 3:
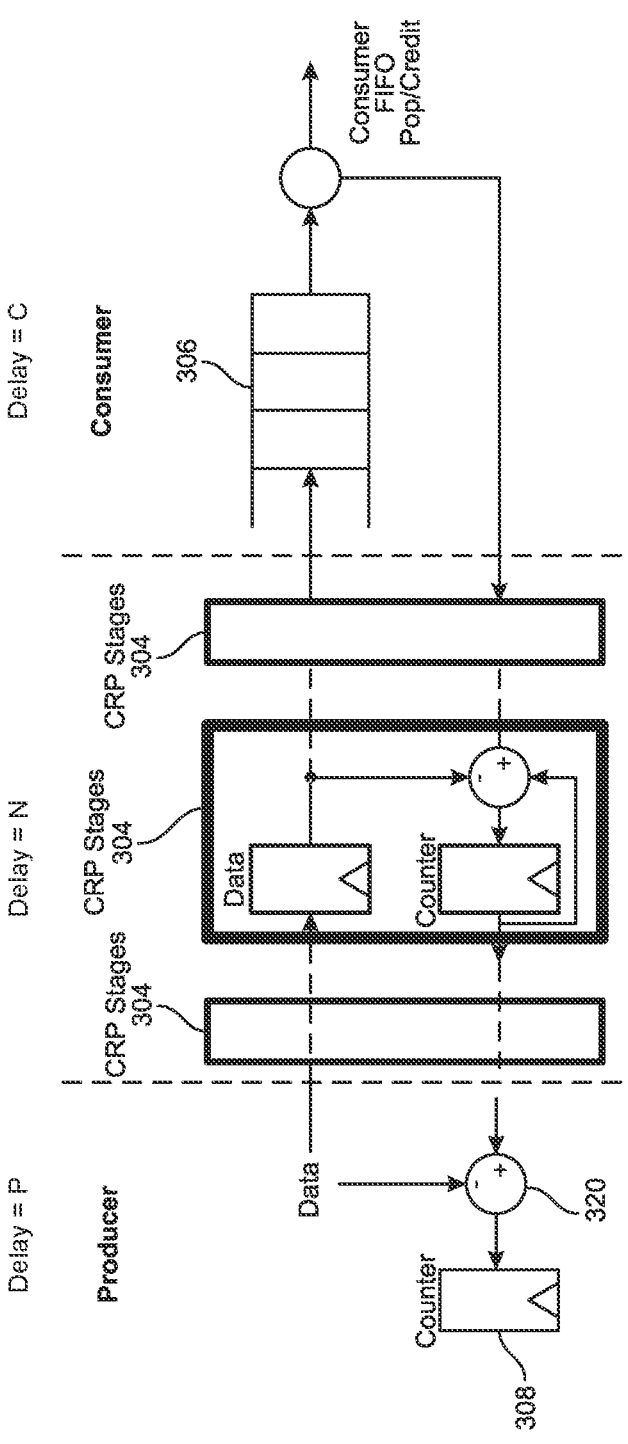

FIG. 3 continues the overview of credit repeater pipeline technology. This figure shows a producer counter 308, different instances of a credit repeater pipeline stage 304, and a consumer 306. As further shown in this figure, the credit repeater pipeline viewed as an extension of the FIFO at the consumer. The producer can maintain a credit counter, which can aggregate not just the credits available at the consumer FIFO, but also credits corresponding to open stages within the credit repeater pipeline itself.

In the example of FIG. 3, the consumer can send a control signal along the lower control signal path indicating that the consumer has availability within its FIFO to accept an additional stage of the workload from the corresponding producer. By way of illustrative example, the consumer can send a control signal indicating that the consumer has four separate slots within its FIFO available, and upon reception the producer can treat this notification as an indication to push four words or workloads onto the credit repeater pipeline directed to the consumer.

The credit repeater pipeline of FIG. 3 can achieve the functionality outlined above (i.e., effectively extending the consumer FIFO by supplementing the FIFO with storage space available within the credit repeater pipeline itself) by having each stage of the credit repeater pipeline increment-ing a count of available credits upon reception of a previous value of available credits received from a previous stage (e.g., a previous stage within the pipeline itself or from the consumer previous to entry onto the pipeline itself). Thus, in the example of FIG. 3, the first stage of the pipeline that the credit signal from the consumer encounters can itself incre-ment the counter of available credits from four (as issued by the consumer) to five (the value issued by the consumer but incremented by the first stage). The incrementing of the count of available credits by the first encountered stage of the pipeline can reflect the fact that the available storage within this stage (i.e., the available storage along the top data path) is vacant and has not been used or occupied yet (i.e., because data has not yet returned from the producer to the consumer through that data path, corresponding to arrow 210 or arrow 212 of FIG. 2).

Moreover, this process can repeat for each encountered stage within the pipeline, such that each available stage having a storage unit that is unused or vacant can thereby increment the received count of available credits such that, when the count of available credits reaches the producer finally, the producer sees a count that reflects not just the available storage within the consumer FIFO but also the available storage within the pipeline itself. In this simplified example of FIG. 3, the total count of available credits that will be seen by the producer will be seven, corresponding to the four open slots of the consumer FIFO and the three available slots/stages within the pipeline itself.

In contrast to the incrementing of the count of available credits due to the count propagating from the consumer to the producer, as further discussed above, the count can also be similarly decremented whenever the producer pushes an item of virtual channel data (e.g., generally a word of data) onto the pipeline. This is reflected within FIG. 3 at compo-nent 320, which features both in increment symbol and a decrement symbol, and which corresponds to hardware-limited or logic-implemented intelligence for performing these incrementing/decrementing procedures.

For completeness, it should be observed that the example of FIG. 3 is simplified by only showing a single producer and a single consumer. In more practical examples, however, a single pipeline can connect a multitude of different pro-ducers with a multitude of different consumers. Moreover, although not shown in these figures, a respective arbiter at the source and the destination can coordinate between the various producers and consumers such that each of the different respective producers and each of the different respective consumers can appropriately connect with the interface to the pipeline itself.

As further shown in FIG. 3, there are certain constraints associated with various embodiments of a credit repeater pipeline. In these examples, for the consumer not stalled due to the lack of work, the producer must provide enough requests to cover the credit return latency. In particular, the producer credit C should be at least 2N+C+P. On the other hand, a consumer stalling forces manufacturers to provide sufficient consumer FIFO depth to absorb all requests that the producer can launch. Accordingly, in these scenarios, the consumer FIFO depth must be at least the number of producer credits, which again corresponds to 2N+C+P (e.g., where N corresponds to the number of stages of the pipeline, C corresponds to latency at the consumer side, and P correspond to latency at the producer's side). The reference to 2N reflect the fact that data must propagate along a return path through the pipeline and back, both from the source to destination and back from the destination to the source. In contrast to the constraints of these embodiments, the embodiment that treats the pipeline itself as providing storage available for incrementing credit counts, can effectively divide the latency time in half from 2N to N. In some examples, such as an asynchronous scenario version, the same equations discussed above generally apply, except that the consumer latencies are affected by signal/voltage crossing delay.

Figure 4A:
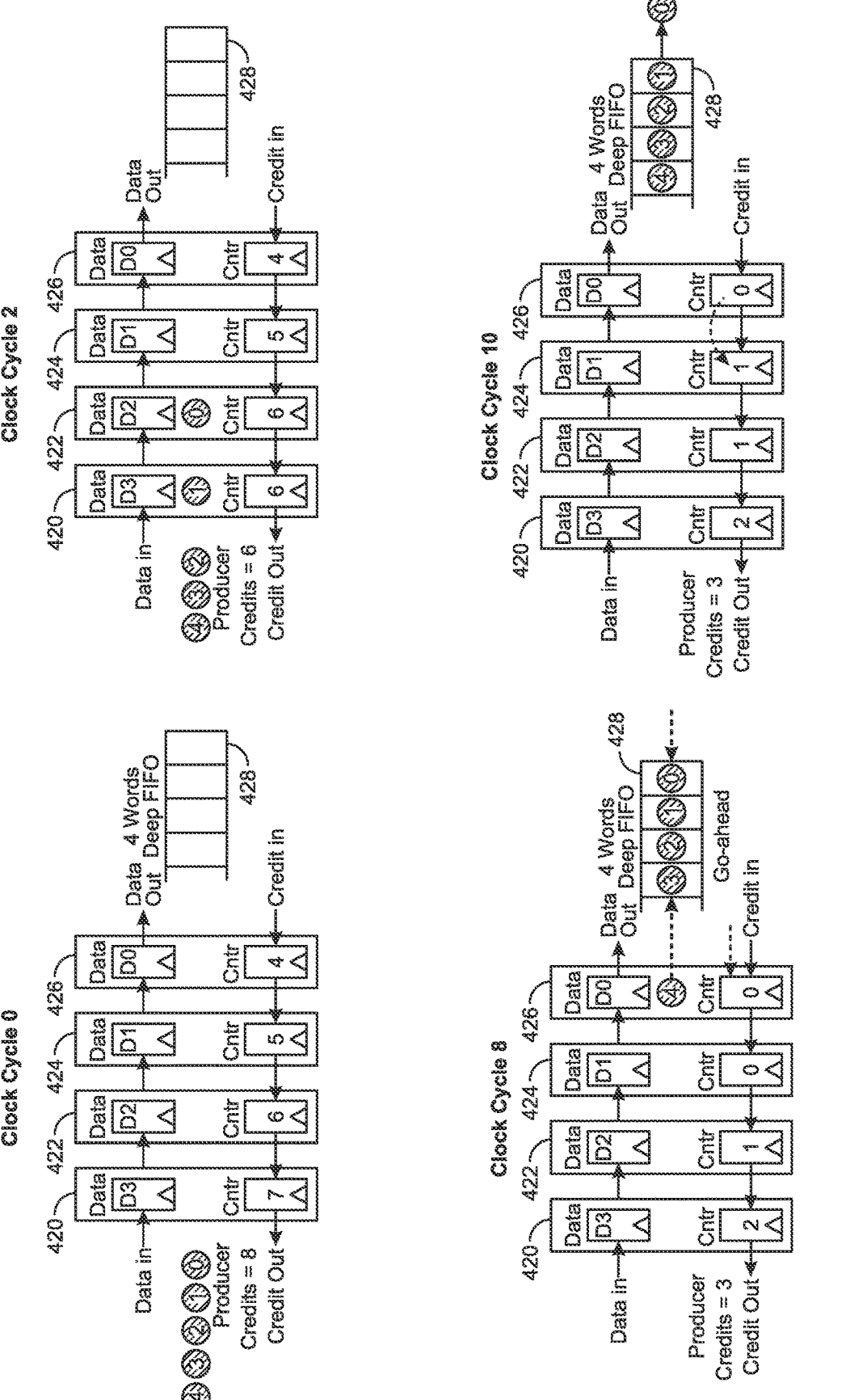
FIGS. 4A-4B are detailed block diagrams indicating state transitions within an example credit repeater pipeline across clock cycles.
Figure 4B:
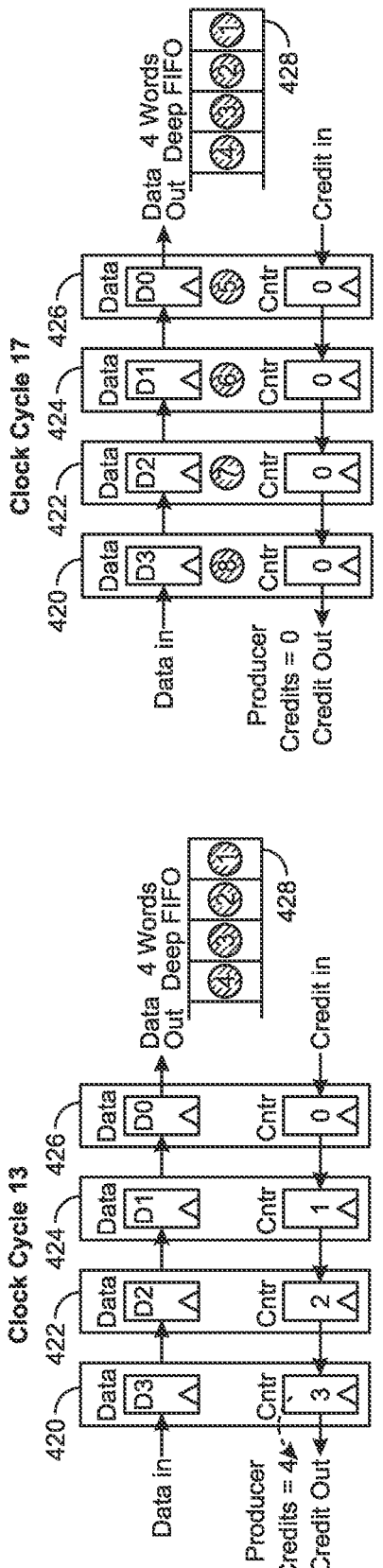
Figure 4B:
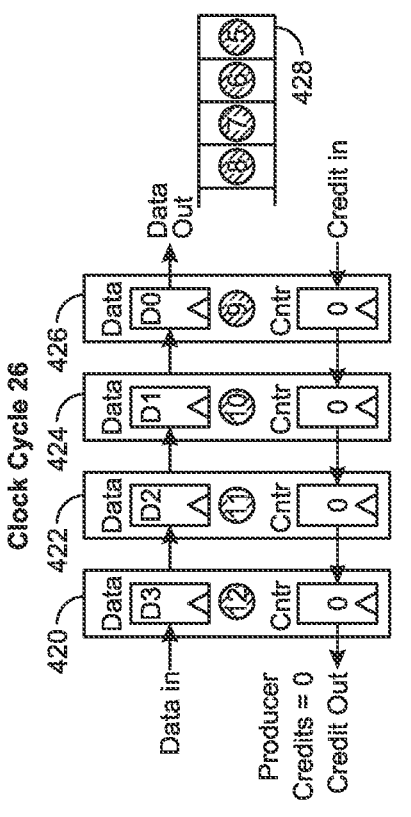

Similarly, FIGS. 4A-4B generally provide an essentially animated overview of how data is processed through a credit repeater pipeline across a number of clock cycles. FIGS. 4A-4B feature pipeline stages 420-426 (each having storage for data and for a counter or "cntr" for a credit count) and FIFO 428.

As further shown in the set of clock cycles, at first the respective pipeline stages can increment the count of credits as discount propagates from consumer to the producer. Accordingly, at clock cycle 0 at the top left of FIG. 4A, the credit count has been incremented from 4-7 (e.g., incrementing the count received from the neighboring stage as indicated by the arrows) at each respective stage of the pipeline.

In contrast, as storage space within each stage of the credit repeater pipeline becomes consumed, then the corresponding stage in these cases does not increment the count of available credits. Accordingly, at clock cycle 2 on the top right of FIG. 4A (e.g., having propagated data "0" in clock cycle one, and both data "0" and data "1" in clock cycle 2), the count remains 6 between stage 422 and stage 420 (e.g., not incrementing the counter 6), and remains 6 between stage 420 and the producer (e.g., also not incrementing the counter 6), due to the fact that these particular stages are already storing corresponding data.

Notably, at clock cycle 8 (bottom left of FIG. 4A, after propagating data "0" through stages 420-426 and through four entries of FIFO 428, with following data "1," "2," "3," and "4" pushed), the figures reflect a scenario whereby the producer and the credit repeater pipeline have credits but the producer has stalled and is temporarily no longer pushing words onto the pipeline. This results in the credit count at the producer remaining at 3 for a series of clock cycles.

Clock cycle 10 (bottom left of FIG. 4A) shows that after consuming data "0" (e.g., at clock cycle 9), data "4" is now pushed onto FIFO 428 such that stage 426 can now increment the credit count. However, the producer credits remain at 3 until the updated credit count can propagate through stages 424, 422, and 420, (e.g., at clock cycle 13 in the top left of FIG. 4B).

Clock cycle 17 (top right of FIG. 4B) reflects another scenario whereby the consumer is stalled. In this scenario the producer has pushed for more requests while removing credit repeater pipeline bubbles. The producer was able to push data because the pipeline has free capacity (e.g., as reflected at clock cycle 13) and the ability to remove bubbles. It took four cycles to achieve this. In effect, it can be said that the repeater has been effectively extended into a deeper consumer FIFO. Related repeater methodologies cannot achieve this advantage, as further discussed above.

Lastly, at clock cycle 26, the consumer stall has been resolved at clock cycle 18 (e.g., consuming data "1" to free up a space in FIFO 428). Accordingly, the consumer emptied its FIFO over four cycles (e.g., clock cycle 21). The pipeline started providing new data as soon as the first credit was received at clock cycle 19 (e.g., taking one clock cycle to propagate the free credit). It took eight cycles (e.g., clock cycle 26 being eight cycles after clock cycle 19) for the pipeline to provide post-stalled data. The producer received the first credit in clock cycle 22 (e.g., clock cycle 18+4 cycles for propagating the credits). Thus, the pipeline is replenished with new producer requests at clock cycle 26. The consumer is emptying the FIFO faster than the pipeline provides stored data during the post-stall shadow. By the time the producer would have emptied the combination of the pipeline and the FIFO data, new data arrives.

In view of the above discussion, it is also helpful to consider whether each credit repeater pipeline stage contains a single word or two words of available storage. With single word stages, the methodology of FIGS. 4A-4B can increase efficiency from 0% to 50% in comparison to related repeater pipeline configurations that do not use this methodology. Nevertheless, embellishing each stage with two words rather than a single word can fully increase the post-stall credit repeater pipeline bandwidth to 100%. In that case, the consumer's FIFO can be fully removed. For these reasons, the double word credit repeater pipeline can be considered an optional embodiment with significant benefits.

The above discussion of FIGS. 2-4B focuses on credit repeater pipelines, yet the discussion so far has not focused as much on the relationship between the credit repeater pipeline and respective virtual channels. Accordingly, the following discussion will help to introduce the concept of virtual channels with respect to the credit repeater pipeline.

For example, if in FIG. 2 rather than a single consumer 206 coupled to repeater pipeline 204, a multiplicity consumers were coupled to the single physical path for propagating data along the credit repeater pipeline, this configuration creates a hazard scenario whereby a single one of the consumers might block the credit repeater pipeline, because that single consumer itself has become blocked and can no longer consume data, at least temporarily (see, e.g., clock cycle 8 in FIG. 4A and/or clock cycle 17 in FIG. 4B). Meanwhile, data for the remaining consumers can stall in the credit repeater pipeline.

Figure 5:
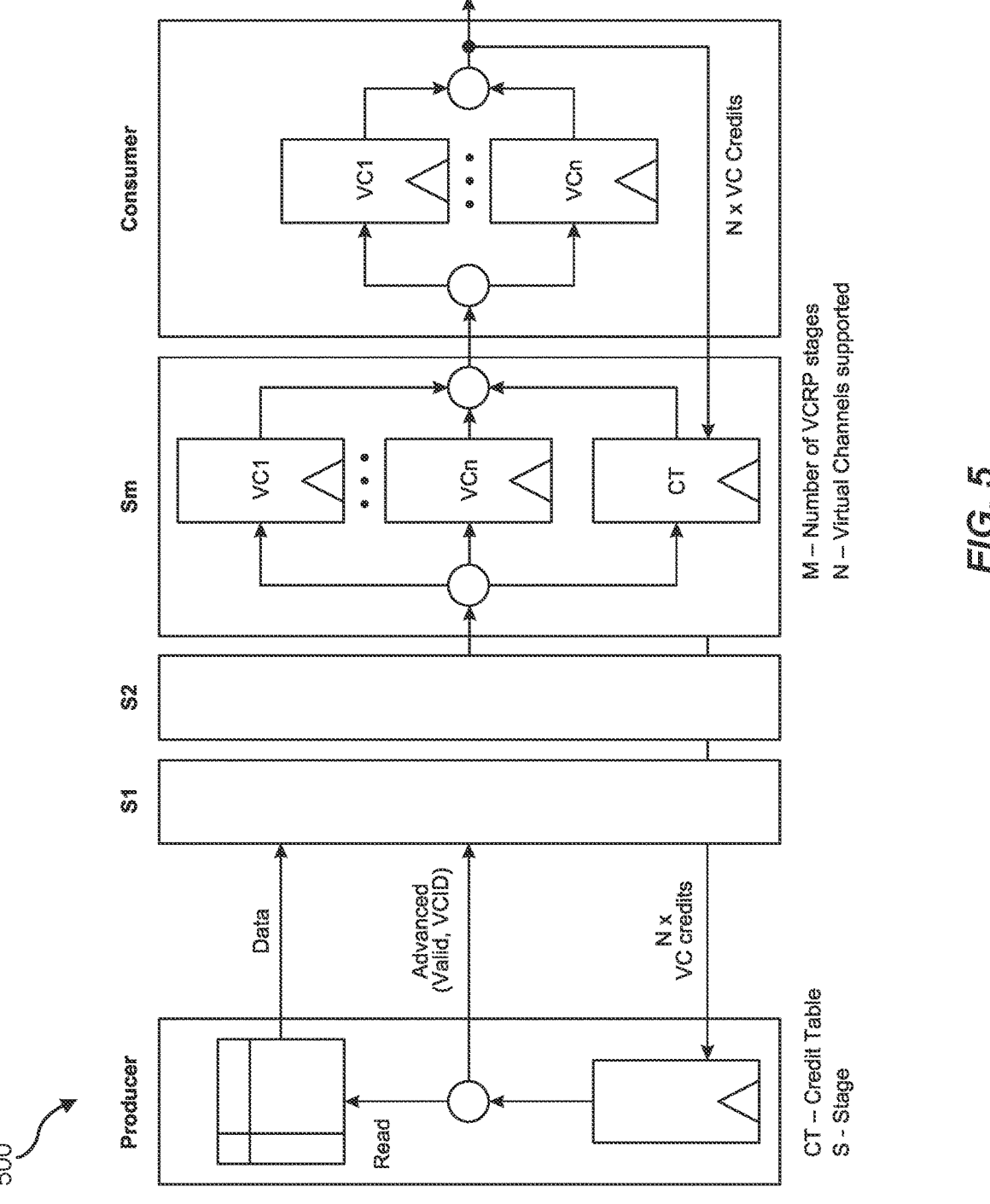
FIG. 5 is a block diagram illustrating a virtual channel enabled credit repeater pipeline.

In view of the above, it would be beneficial to devise a virtual channel enabled credit repeater pipeline that does not suffer from the blocking dilemma outlined above, while nevertheless appropriately servicing multiple consumers or respective virtual channels. FIG. 5 shows such a diagram of a system 500 including an example virtual channel enabled credit repeater pipeline that can address the dilemma outlined above. As further shown in this figure, although a single physical path (e.g., a through silicon via) may be provided between each stage of multiple stages of the pipeline (e.g., M number of stages), there are nevertheless multiple data propagation paths (as distinct from the control signal propagation path at bottom). In the example of FIG. 5, the multiple paths within each stage can match the total number of virtual channels (i.e., N paths within each stage, corresponding to N different virtual channels or N different consumers). Nevertheless, this can grow increasingly expensive or impractical as the number of virtual channels increases. For these reasons, the configuration of FIG. 5 can in some examples only involve two separate data propagation paths for two separate virtual channels, whereas greater numbers of virtual channels might be addressed using a variation of this multiple virtual channel path architecture. Accordingly, in other examples (including, e.g., the scalable architecture of FIG. 6), a smaller number of paths within each stage can be used, while nevertheless providing multiple distinct data propagation paths, thereby contrasting with a single data propagation path of FIGS. 2-4B. In other words, there can be embodiments without virtual channels where there is only a single flow of data. By having two words per stage, one hundred percent throughput can be obtained in all possible scenarios. One scenario involves consumer credit exhaustion (i.e., the consumer FIFO is full) due to a consumer stall. When the stall is lifted, with two words per stage one hundred percent throughput is achieved after the stall. With one word per stage fifty percent throughput is achieved.

Figure 6:
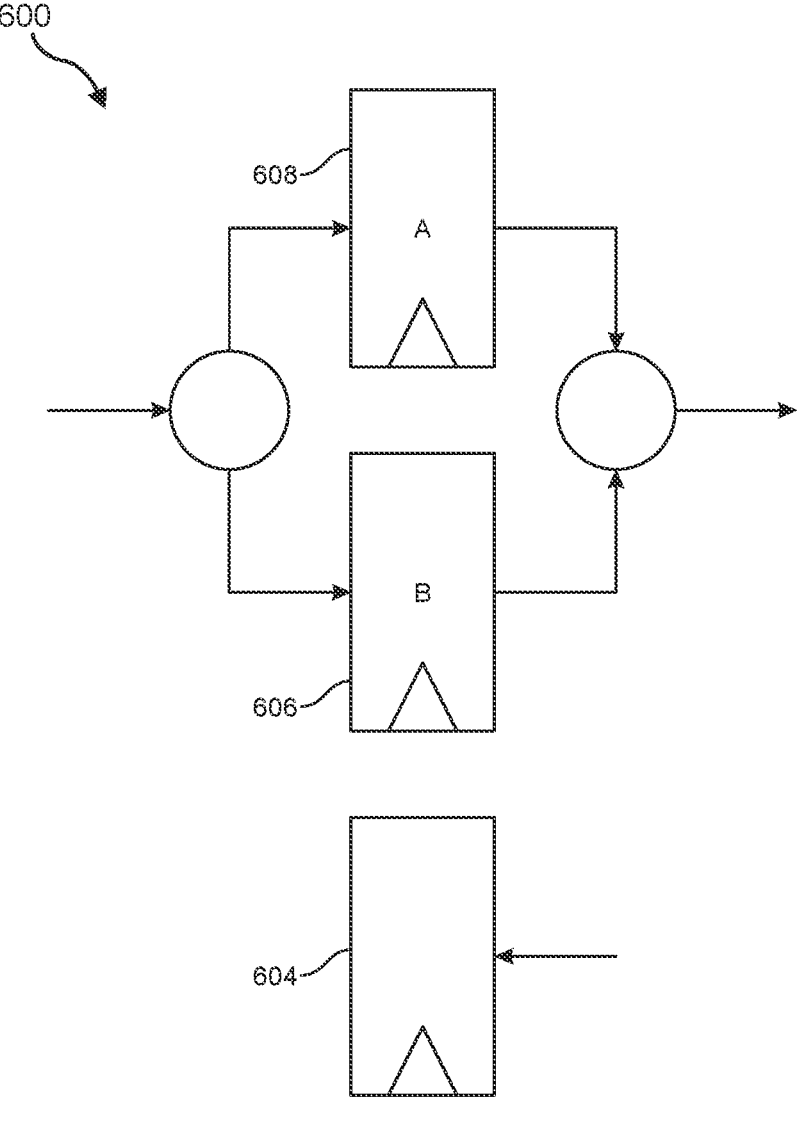
FIG. 6 is a block diagram illustrating a scalable virtual channel enabled credit repeater pipeline.
Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

As introduced above, FIG. 6 shows a simplified diagram 600 for a scalable version of the virtual channel enabled credit repeater pipeline. As further shown in this figure, diagram 600 can include a path 608 for data propagation within each respective stage, and can also include a path 606 for data propagation within each respective stage. Path 604 can correspond to the control signal for reporting or incrementing the count of available credits, as further outlined above in connection with FIGS. 2-4B, for example.

For both FIG. 5 and FIG. 6, it is true that the virtual channel enabled credit repeater pipeline connects the data consumer and the data producer across multiple data propagation tracks. In FIG. 5 these correspond to the multiple virtual channel paths, and in FIG. 6 these correspond to path A and path B as discussed further below. Similarly, for both FIG. 5 and FIG. 6, it is also true that the system including the virtual channel enabled credit repeater pipeline at the data producer selects which of the multiple data propagation tracks to use for forwarding virtual channel data based at least in part on an amount of credits available to a virtual channel to which the virtual channel data belongs. Generally speaking, this selection can be performed by the producer, the pipeline, and/or an interface between the two, as appropriate, and the phrase "at the producer" should therefore be interpreted broadly in the sense of general proximity. For FIG. 5, the pipeline or arbiter will select the matching virtual channel if that channel has sufficient credits, whereas for FIG. 6 the pipeline or arbiter will select the guaranteed path or the opportunistic path depending on whether the amount of credits is sufficient, as discussed in more detail below. Moreover, as used herein, the term "data propagation paths" generally refers to separate paths for sending data (as distinct from credit/control signals) across a repeater pipeline, consistent with the multiple virtual channel paths in each stage of FIG. 5, and consistent with path A and path B of FIG. 6, as discussed further below.

Returning to FIG. 1, at step 104, one or more of the systems described herein can evaluate whether a corresponding channel has a sufficient amount of credits for forwarding the virtual channel data along a guaranteed track. Moreover, at step 104, one or more of the systems herein might evaluate whether there are sufficient opportunistic track transport credits to forward data along a corresponding opportunistic track.

As used herein, the phrase "evaluate" can refer broadly to any hardware-implemented or logical-component-implemented assurance that virtual channel data will be propagated along an opportunistic track rather than a guaranteed track when the corresponding virtual channel does not have sufficient credits to satisfy the guarantee of the guaranteed channel, consistent with step 104 and step 106, as discussed further below. Accordingly, the term "evaluate" might not necessarily refer to firmware or software-implemented intelligence, although this application contemplates those embodiments as well.

As used herein, the term "sufficient amount of credits" can generally refer to an amount of credits greater than zero such that there is at least one slot available for a corresponding producer to push an item of virtual channel data onto the pipeline, and consistent with the general discussion of credit systems above. Similarly, as used herein, the term "corresponding channel" generally refers to the virtual channel matching the virtual channel data or to which the virtual channel data belongs.

Moreover, as used herein, the term "guaranteed track" can generally refer to a source to destination track within the pipeline that is configured such that the guaranteed track only receives an item of virtual channel data from the producer when the guarantee of at least one available credit is satisfied, which can correspond to a destination credit and a guaranteed track transport credit. In this manner, the guaranteed track should not experience any bandwidth problems because the appropriate amount of bandwidth or data storage capacity should always be available due to strict compliance with the credit system, as discussed above. The term "guaranteed track" can generally be contrasted with the "opportunistic track" of step 106, which can function as an alternative to the guaranteed track and which can accept virtual channel data even if the corresponding guarantee has not been satisfied, and therefore there is a risk that the opportunistic track can experience bandwidth problems or slowdowns, etc. Generally speaking, there are guaranteed and opportunistic physical tracks within virtual credit repeater pipeline stages while there might be one set of wires between the virtual credit repeater pipeline. Moreover, these wires are shared by both tracks.

To summarize the above, the embodiment involving a guaranteed track and an opportunistic track (see FIG. 1) can correspond to the scalable virtual channel enabled credit repeater pipeline, which is also discussed in more detail below regarding FIG. 6. On the other hand, a more generalized version of the virtual channel enabled credit repeater pipeline can still provide benefits without necessarily using these two specific types of tracks, as further discussed above regarding FIG. 5.

Step 104 can be performed in a variety of ways. Generally speaking, step 104 can be performed by the producer on one end point of the credit repeater pipeline or corresponding logic, such an arbiter performing arbitration between multiple flows or virtual channels at the producer endpoint. In the context of FIG. 6, such an arbiter can decide, determine, evaluate, or simply assure that virtual channel data is only provided from the producer onto one track (e.g., the guaranteed track, which can correspond to path A in FIG. 6) when the corresponding virtual channel has a sufficient number of credits available, whereas the arbiter can similarly assure that the virtual channel data as otherwise provided along at least one alternative path (e.g., path B in FIG. 6), which can function opportunistically, in the sense that this alternative path can accept words or virtual channel data even when credits are insufficient (e.g., below zero or below a suitable threshold), whereas there is also an available opportunistic track transport credit. Notably, although FIG. 6 focuses on an embodiment with only two data propagation paths, in other examples a larger number of data propagation paths might be used, and this larger number can nevertheless still be lower than the total number of virtual channels or corresponding consumers.

Moreover, in FIG. 6, virtual channels that do not have any credits can take path A. The consumer post stall shadow does not apply, and there can be two words. The virtual channel arbiter keeps transport credits for path A and path B, as well as virtual channel end credits. If the arbiter does not have a virtual channel credit, it can send the virtual channel data if there is nevertheless a transport credit for path B. Virtual channels that do not have end credits can take path B. Generally speaking, path A should be selected if that path has data. One exception would be if both paths have data for the same virtual channel and if path B data has an end credit (path A always has an end credit). If so, then select a path to maintain virtual channel word ordering.

Returning to FIG. 1, at step 106, one or more of the systems described herein can forward the virtual channel data along an opportunistic track of the virtual channel enabled credit repeater pipeline based on the corresponding channel having an insufficient number of credits. For example, at step 106, the producer at one end point of the virtual channel enabled credit repeater pipeline can forward virtual channel data across path B of FIG. 6 rather than path A due to a determination or assurance that the virtual channel data belongs to a channel that has an insufficient number of credits, as further discussed above. Usage of the opportunistic path can enable data to being moved even if bandwidth is not guaranteed, thereby helping to avoid costly downtime whereby the failure of the guarantee effectively halts the entire pipeline. Moreover, intelligence can be supplemented into the pipeline to enable crossover from one path to another path as slots open up at the producer and/or consumer, etc. Thus, an item of virtual channel data stuck in the opportunistic path might be intelligently crossed over to the guaranteed path if and when an available slot opens up and/or a consumer resumes after stalling, for example.

In some examples, a data producer can be a system level component (e.g., a virtual channel (VC) arbiter, a load balancer, etc.). In some examples, a data producer can be part of a transport system made from a VCRP data producer, VCRP stages, and VCRP data consumer. As described herein, the VCRP data producer can decide whether a VC data should go to a guaranteed VCRP path or an opportunistic VCRP path. A host system level data producer can, in some examples, be a different entity from the VCRP data producer. The host system level data producer can choose a VC based on criteria such as load balance, priority, etc. and give data to the VCRP data producer. However, in implementations having both the system level data producer and the VCRP data producer, to prevent potential conflicts (e.g., the system level data producer selecting a VC having no end credits while the opportunistic path does not have credits either), in some examples the VCRP data producer can incorporate some of the functionality of the system level data producer (e.g., selecting VCs based on host system policies such as load balance, priority, etc.).

One benefit of the virtual channel credit repeater pipeline is that it can prevent the blocking of the flow of information, such that a stalled virtual channel at the consumer side is prevented from blocking any other virtual channels. Furthermore, the virtual channel credit repeater pipeline ensures data ordering within a virtual channel. A virtual channel can run out of end credits while its data is in path A, as described above. In this scenario, the virtual channel's words will be via path B. The virtual channel credit repeater pipeline will send virtual channel data to the consumer in the order the producer pushed the data.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example Implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a data consumer;
   a data producer; and
   a repeater pipeline comprising a plurality of flops that connects the data consumer and the data producer across multiple data propagation tracks;
   wherein the repeater pipeline maintains a counter of credits that correspond to a combined available storage within the repeater pipeline and the data consumer; and
   wherein the system at the data producer selects which of the multiple data propagation tracks to use for forwarding virtual channel data based at least in part on an amount of credits available to a virtual channel implemented with one or more of the multiple data propagation tracks.

2. The system of claim 1, wherein the repeater pipeline comprises a scalable virtual channel enabled credit repeater pipeline that supports multiple virtual channels.

3. The system of claim 2, wherein the scalable virtual channel enabled credit repeater pipeline enables a number of the multiple virtual channels that is greater than a number of physical tracks of stages of the scalable virtual channel enabled credit repeater pipeline.

4. The system of claim 1, wherein a number of separate paths within each stage of the repeater pipeline matches a number of virtual channels enabled by the repeater pipeline.

5. The system of claim 4, wherein the virtual channels share a same single physical path between stages of the repeater pipeline.

6. The system of claim 4, wherein the separate paths within each stage of the repeater pipeline enable one virtual channel to continue processing while another virtual channel remains momentarily stalled.

7. The system of claim 1, wherein each stage within multiple stages of a repeater chain for the repeater pipeline are identical.

8. The system of claim 1, wherein the repeater pipeline supports N number of virtual channels through N sets of parallel data words.

9. The system of claim 8, wherein each data word is as wide as a widest virtual channel.

10. The system of claim 1, wherein at least some stages of the repeater pipeline are connected by through silicon via bridges.

11. A data producer comprising:
a receptor that receives a control signal across a repeater pipeline that comprises a plurality of flops; and
a transmitter that provides data for consumption by a data consumer at an opposite end of the repeater pipeline;
wherein the repeater pipeline maintains a counter of credits that corresponds to a combined available storage within the repeater pipeline and the data consumer; and
wherein the data producer is configured such that a selection is made at the data producer selecting which of multiple data propagation tracks to use for forwarding virtual channel data based at least in part on an amount of credits available to a virtual channel implemented with one or more of the multiple data propagation tracks.

12. The data producer of claim 11, wherein the repeater pipeline comprises a scalable virtual channel enabled credit repeater pipeline that supports multiple virtual channels.

13. The data producer of claim 12, wherein the scalable virtual channel enabled credit repeater pipeline enables a number of the multiple virtual channels that is greater than a number of physical tracks of stages of the scalable virtual channel enabled credit repeater pipeline.

14. The data producer of claim 11, wherein a number of separate paths within each stage of the repeater pipeline matches a number of virtual channels enabled by the repeater pipeline.

15. The data producer of claim 14, wherein the virtual channels share a same single physical path between stages of the repeater pipeline.

16. A data consumer comprising:
a transmitter that provides a control signal across a repeater pipeline that comprises a plurality of flops; and
a receptor that receives data for consumption by a data consumer from a data producer at an opposite end of the repeater pipeline;
wherein the repeater pipeline maintains a counter of credits that correspond to a combined available storage within the repeater pipeline and the data consumer; and
wherein the data consumer is configured such that a selection is made at the data producer selecting which of multiple data propagation tracks to use for forwarding virtual channel data based at least in part on an amount of credits available to a virtual channel implemented with one or more of the multiple data propagation tracks.

17. The data consumer of claim 16, wherein the repeater pipeline comprises a scalable virtual channel enabled credit repeater pipeline that supports multiple virtual channels.

18. The data consumer of claim 17, wherein the scalable virtual channel enabled credit repeater pipeline enables a number of the multiple virtual channels that is greater than a number of physical tracks of stages of the scalable virtual channel enabled credit repeater pipeline.

19. The data consumer of claim 16, wherein a number of separate paths within each stage of the repeater pipeline matches a number of virtual channels enabled by the repeater pipeline.

20. The data consumer of claim 19, wherein the virtual channels share a same single physical path between stages of the repeater pipeline.

* * * * *